(12) United States Patent
Yajima (10) Patent No.: US 11,835,153 B2
(45) Date of Patent: Dec. 5, 2023

(54) FLUID CONTROL VALVE

(71) Applicant: SMC CORPORATION, Tokyo (JP)

(72) Inventor: Hisashi Yajima, Tsukuba (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/656,927

(22) Filed: Mar. 29, 2022

(65) Prior Publication Data

US 2022/0316619 A1     Oct. 6, 2022

(30) Foreign Application Priority Data

Apr. 5, 2021 (JP) ................................. 2021-064093

(51) Int. Cl.
| F16K 39/02 | (2006.01) |
| F16K 31/06 | (2006.01) |
| F16K 41/12 | (2006.01) |
| G05D 16/06 | (2006.01) |
| G05D 16/16 | (2006.01) |

(52) U.S. Cl.
CPC ........ *F16K 39/022* (2013.01); *F16K 31/0655* (2013.01); *F16K 41/12* (2013.01); *G05D 16/163* (2013.01); *Y10T 137/7801* (2015.04); *Y10T 137/7821* (2015.04)

(58) Field of Classification Search
CPC ........... G05D 16/0633; G05D 16/0638; G05D 16/0663; G05D 16/0666; Y10T 137/261; Y10T 137/7801; Y10T 137/7809; Y10T 137/7812; Y10T 137/7818; Y10T 137/782; Y10T 137/7821
See application file for complete search history.

(56) References Cited

U.S. PATENT DOCUMENTS

| 333,587 A | * | 1/1886 | Beatty | ................ G05D 16/0663 |
| | | | | 251/360 |
| 2,707,966 A | * | 5/1955 | Taplin | ................ G05D 16/0663 |
| | | | | 137/505.34 |
| 2,712,321 A | * | 7/1955 | Grogan | .................... G05B 6/05 |
| | | | | 137/86 |

(Continued)

FOREIGN PATENT DOCUMENTS

| JP | 2001-099344 A | 4/2001 |
| JP | 2007-148465 A | 6/2007 |

OTHER PUBLICATIONS

Extended European Search Report dated Sep. 15, 2022 in European Patent Application No. 22165821.4, 10 pages.

*Primary Examiner* — Robert K Arundale
(74) *Attorney, Agent, or Firm* — Oblon, McClelland, Maier & Neustadt, L.L.P.

(57) ABSTRACT

A first diaphragm and a second diaphragm are disposed between a valve element and a body, a diaphragm chamber is formed between the first diaphragm and the second diaphragm, the first diaphragm separates a valve chamber from the diaphragm chamber, and the second diaphragm separates the diaphragm chamber from a back pressure chamber. The diaphragm chamber communicates with an output port, the valve chamber and the back pressure chamber communicate with an input port. A difference between an effective pressure receiving area of the first diaphragm and an effective pressure receiving area of the second diaphragm is equivalent to a passage area in a valve seat.

8 Claims, 6 Drawing Sheets

(56) References Cited

U.S. PATENT DOCUMENTS

| | | | | |
|---|---|---|---|---|
| 2,731,975 | A * | 1/1956 | Boals | G05D 16/107 |
| | | | | 137/116.5 |
| 2,761,464 | A * | 9/1956 | Faust | G05D 16/0672 |
| | | | | 137/116.5 |
| 2,806,481 | A * | 9/1957 | Faust | G05D 16/163 |
| | | | | 137/484.8 |
| 3,545,471 | A * | 12/1970 | Taplin | G05D 16/0641 |
| | | | | 137/505.34 |
| 5,261,447 | A * | 11/1993 | Boticki | G05D 16/163 |
| | | | | 137/513.5 |
| 6,079,434 | A * | 6/2000 | Reid | G05D 16/0655 |
| | | | | 137/484.8 |
| 6,386,509 | B1 | 5/2002 | Mastuzawa et al. | |
| 2004/0231726 | A1* | 11/2004 | Nakajima | B60L 58/33 |
| | | | | 137/505.18 |
| 2004/0261859 | A1 | 12/2004 | Callies | |
| 2008/0110506 | A1* | 5/2008 | Igarashi | F16K 41/10 |
| | | | | 251/324 |

\* cited by examiner

FLUID CONTROL VALVE

CROSS-REFERENCE TO RELATED APPLICATIONS

This application is based upon and claims the benefit of priority from Japanese Patent Application No. 2021-064093 filed on Apr. 5, 2021, the contents of which are incorporated herein by reference.

BACKGROUND OF THE INVENTION

Field of the Invention

The present invention relates to a fluid control valve which is capable of controlling a pressure or a flow rate of a fluid.

Description of the Related Art

Conventionally, a pressure regulating valve has been known in which a diaphragm capable of regulating a secondary pressure is used. For example, in JP 2007-148465 A, a pressure regulator is disclosed which includes a pressure regulating shaft that causes a valve element portion to approach and separate away from a valve seat portion. Such a pressure regulating shaft reciprocates by being connected to a pressure regulating diaphragm that operates to an equilibrium point between a secondary pressure and a spring force of a pressure regulating spring. The secondary pressure acts as a back pressure on the pressure regulating shaft, and a lip packing is arranged between the pressure regulating shaft and a holder.

Further, in JP 2001-099344 A, a back pressure control valve is disclosed, which is equipped with a rod portion having a valve member that opens and closes a valve seat, a first diaphragm member arranged inside a first chamber, and a second diaphragm member arranged inside a second chamber. In such a back pressure control valve, an effective pressure receiving area of the second diaphragm member is equivalent to an effective area of the valve seat, and the rod portion is configured so as not to move accompanying a fluctuation in load on a secondary side.

SUMMARY OF THE INVENTION

However, in the pressure regulator disclosed in JP 2007-148465 A, fluctuations in a primary pressure are not taken into consideration. In addition, there is resistance due to the sliding movement between the pressure regulating shaft and the lip packing, which causes problems such as generation of dust or debris. In the back pressure control valve disclosed in JP 2001-099344 A as well, fluctuations in the primary pressure are not taken into consideration.

The present invention has been devised with the aim of solving the aforementioned problems.

A fluid control valve according to the present invention comprises a body including an input port and an output port, and a valve element configured to abut against a valve seat of the body, wherein a first diaphragm and a second diaphragm are disposed between the valve element and the body. A diaphragm chamber is formed between the first diaphragm and the second diaphragm. The first diaphragm separates a valve chamber from the diaphragm chamber, and the second diaphragm separates the diaphragm chamber from a back pressure chamber. The diaphragm chamber communicates with the output port, and the valve chamber and the back pressure chamber communicate with the input port. A difference between an effective pressure receiving area of the first diaphragm and an effective pressure receiving area of the second diaphragm is equivalent to a passage area in the valve seat. Instead of the diaphragm chamber communicating with the output port, and the valve chamber and the back pressure chamber communicating with the input port, the diaphragm chamber may communicate with the input port, and the valve chamber and the back pressure chamber may communicate with the output port.

Further, a fluid control valve according to the present invention comprises a body including an input port and an output port, and a valve element configured to abut against a valve seat of the body, wherein a first diaphragm and a second diaphragm are disposed between the valve element and the body. A diaphragm chamber is formed between the first diaphragm and the second diaphragm. The first diaphragm separates a valve chamber from the diaphragm chamber, and the second diaphragm separates the diaphragm chamber from a back pressure chamber. The diaphragm chamber communicates with the output port, and the valve chamber and the back pressure chamber communicate with the input port. One end part of the valve element extends from the back pressure chamber toward a chamber that is disposed on an outer side of the body and communicates with the output port. A difference between an effective pressure receiving area of the first diaphragm and an effective pressure receiving area of the second diaphragm is equivalent to a difference between a passage area in the valve seat and a cross-sectional area of the one end part of the valve element.

According to the respective fluid control valves described above, even if one or both of the primary pressure and the secondary pressure fluctuate, a force that brings about an instability in operation is not applied to the valve element, and the control or the operation of the fluid control valve is maintained in a stable manner.

The fluid control valve according to the present invention includes a predetermined relationship between the effective pressure receiving area of the first diaphragm, the effective pressure receiving area of the second diaphragm, and the passage area in the valve seat. Therefore, the control or the operation thereof is maintained in a stable manner, even if one or both of the primary pressure and the secondary pressure fluctuate.

The above and other objects, features, and advantages of the present invention will become more apparent from the following description when taken in conjunction with the accompanying drawings, in which preferred embodiments of the present invention are shown by way of illustrative example.

DESCRIPTION OF THE INVENTION

In the following description, when terms in relation to upper and lower directions are used, for the sake of convenience, such terms refer to the directions shown in the drawings, however, the actual arrangement of the respective constituent members and the like is not limited thereby.

First Embodiment

Figure 1:
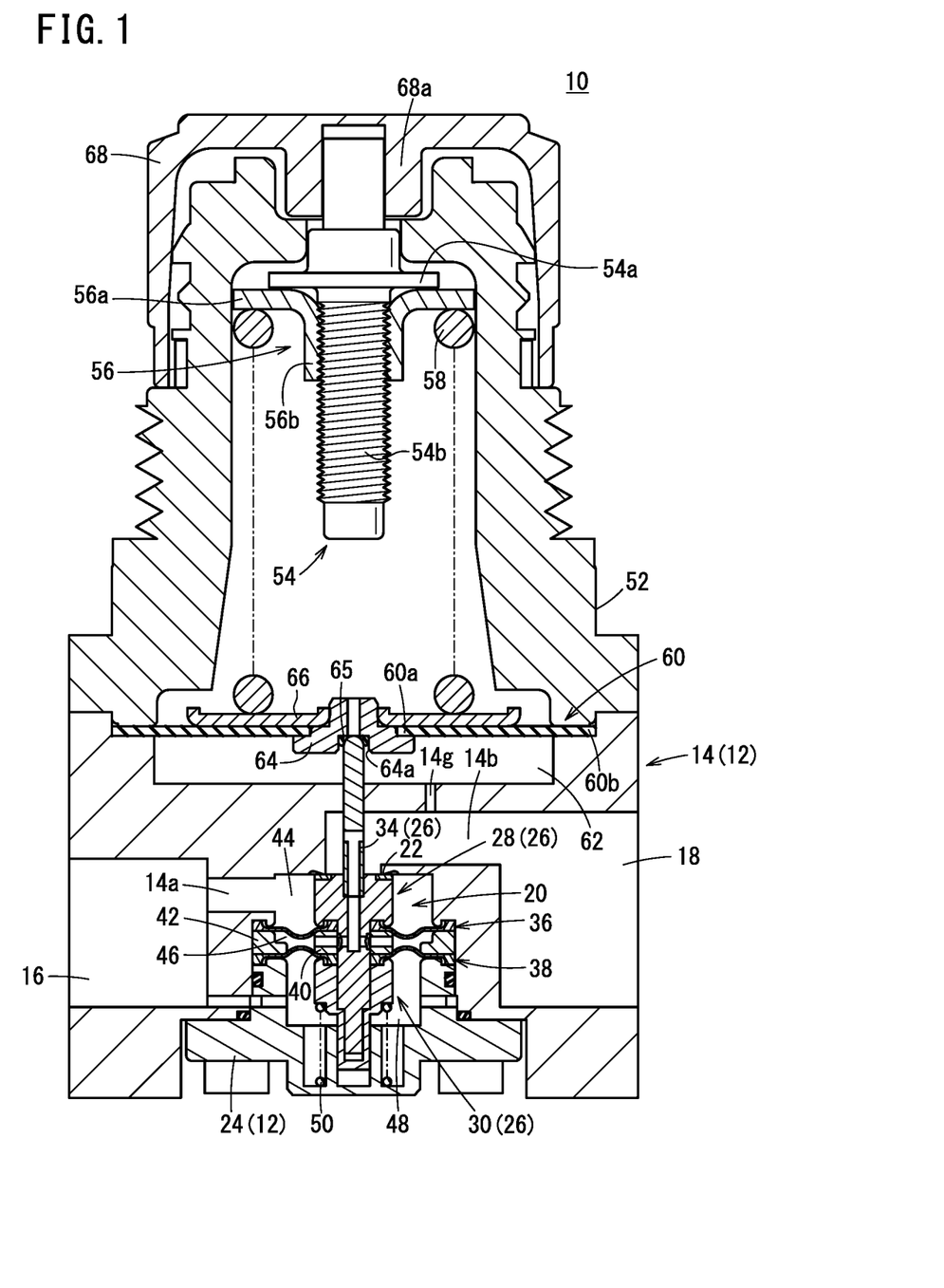
FIG. 1 is a cross-sectional view of a fluid control valve according to a first embodiment of the present invention.
Figure 2:
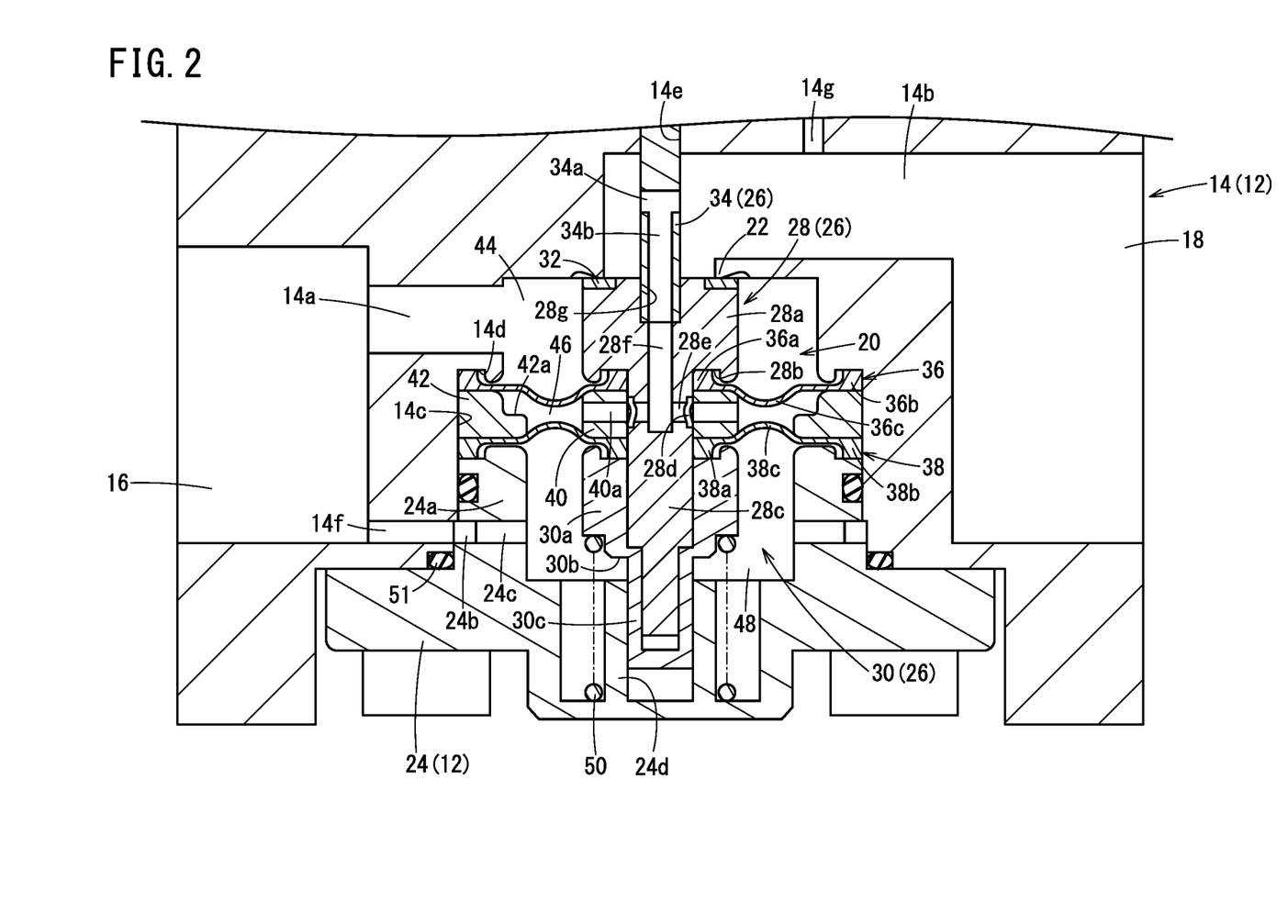
FIG. 2 is a partially enlarged view of the fluid control valve shown in FIG. 1.

A description will be given with reference to FIGS. 1 and 2 concerning a fluid control valve 10 according to a first embodiment of the present invention. The fluid control valve 10 functions as a pressure regulator. The fluid control valve 10 includes a body 12, a bonnet 52, and in the interior of these elements, a balancing mechanism and a pressure regulating mechanism. The balancing mechanism is constituted by a valve element 26, a first diaphragm 36, a second diaphragm 38, and the like. The pressure regulating mechanism is constituted by a pressure regulating shaft 54, a pressure regulating spring 58, a pressure regulating diaphragm 60, and the like. The body 12 is formed of a main body portion 14 and a cover body 24, and the valve element 26 is formed of a main valve element 28, an additional valve element 30, and a stem 34.

The main body portion 14 includes an input port 16 and an output port 18 which are arranged to face each other on the same axis. The cover body 24 is installed on a lower part of the main body portion 14. The main body portion 14 includes a valve element accommodating chamber 20 that is closed by the cover body 24. An upper part of the valve element accommodating chamber 20 communicates with the input port 16 via an input passage 14a, and also communicates with the output port 18 via an output passage 14b. The main body portion 14 is equipped with a valve seat 22 at a portion where the valve element accommodating chamber 20 faces the output passage 14b.

The cover body 24 includes an upwardly projecting cylindrical fitting portion 24a, and the fitting portion 24a is fitted into a fitting hole 14c provided in a lower part of the main body portion 14. An upper end of the fitting portion 24a of the cover body 24 faces toward a stepped portion 14d with a predetermined gap therebetween, the stepped portion 14d being contiguous with the fitting hole 14c of the main body portion 14. In such a gap, as will be described later, there are arranged an outer circumferential portion 36b of the first diaphragm 36, a second spacer 42, and an outer circumferential portion 38b of the second diaphragm 38. A bottom part of the cover body 24 includes a cylindrical guide member 24d that protrudes toward the valve element accommodating chamber 20.

The main valve element 28 is arranged inside the valve element accommodating chamber 20, and includes, on an upper end surface thereof, a seal member 32 that abuts against the valve seat 22. The main valve element 28 includes an upper large diameter portion 28a on which the seal member 32 is mounted, and a lower small diameter portion 28c connected to the large diameter portion 28a via a stepped portion 28b. The stem 34 and the additional valve element 30 are connected to the main valve element 28. More specifically, a lower part of the stem 34 is inserted into a stem hole 28g provided in the large diameter portion 28a of the main valve element 28, and the two members are connected to each other by means of press fitting or the like.

Further, the small diameter portion 28c of the main valve element 28 is inserted on an inner side of the additional valve element 30, and the two members are connected to each other by means of screwing or the like.

The stem 34 is inserted through a valve element insertion hole 14e provided in the main body portion 14. The additional valve element 30 includes an upper large diameter portion 30a, and a lower small diameter portion 30c connected to the large diameter portion 30a via a stepped portion 30b. The additional valve element 30 is inserted and supported, at the small diameter portion 30c thereof, on an inner side of the guide member 24d of the cover body 24. Accordingly, the main valve element 28, the additional valve element 30, and the stem 34 are integrally supported so as to be capable of being displaced in axial directions thereof (vertical direction). An upper end of the additional valve element 30 faces toward the stepped portion 28b of the main valve element 28 with a predetermined gap therebetween. In such a gap, as will be described later, there are arranged an inner circumferential portion 36a of the first diaphragm 36, a first spacer 40, and an inner circumferential portion 38a of the second diaphragm 38. The fluid in a back pressure chamber 48, to be described later, flows in an encircling manner around an inner side of the guide member 24d of the cover body 24.

A valve spring 50 is disposed between the stepped portion 30b of the additional valve element 30 and a bottom surface of the cover body 24, so as to surround an outer circumference of the guide member 24d of the cover body 24. The valve spring 50 is formed of a coil spring and biases the additional valve element 30 upward. The main valve element 28 which is integrated with the additional valve element 30 receives a biasing force of the valve spring 50, and is biased in a direction to abut against the valve seat 22.

In the interior of the valve element accommodating chamber 20, the first diaphragm 36 and the second diaphragm 38 are arranged between the valve element 26 and the body 12. Both of the diaphragms are formed from an elastic material in an annular thin membrane shape. The first spacer 40 having a ring shape is arranged between the inner circumferential portion 36a of the first diaphragm 36 and the inner circumferential portion 38a of the second diaphragm 38. The second spacer 42 having a ring shape is arranged between the outer circumferential portion 36b of the first diaphragm 36 and the outer circumferential portion 38b of the second diaphragm 38.

The first diaphragm 36, the first spacer 40, and the second diaphragm 38 are inserted through the small diameter portion 28c of the main valve element 28. The inner circumferential portion 36a of the first diaphragm 36 is sandwiched between the stepped portion 28b of the main valve element 28 and an upper surface of the first spacer 40. The inner circumferential portion 38a of the second diaphragm 38 is sandwiched between the upper end of the additional valve element 30 and a lower surface of the first spacer 40. The outer circumferential portion 36b of the first diaphragm 36 is sandwiched between the stepped portion 14d of the main body portion 14 and an upper surface of the second spacer 42. The outer circumferential portion 38b of the second diaphragm 38 is sandwiched between the upper end of the fitting portion 24a of the cover body 24 and a lower surface of the second spacer 42.

When the valve element 26 is displaced in the vertical direction, the inner circumferential portion 36a of the first diaphragm 36 is displaced together with the valve element 26, and a thin membrane-shaped portion 36c between the inner circumferential portion 36a and the outer circumferential portion 36b of the first diaphragm 36 is deformed. Similarly, when the valve element 26 is displaced in the vertical direction, the inner circumferential portion 38a of the second diaphragm 38 is displaced together with the valve element 26, and a thin membrane-shaped portion 38c between the inner circumferential portion 38a and the outer circumferential portion 38b of the second diaphragm 38 is deformed.

The second spacer 42 includes a stepped portion 42a on an inner circumference thereof. The inner diameter of the second spacer 42 is formed to be greater in the vicinity of the upper surface thereof that is in contact with the first diaphragm 36 than in the vicinity of the lower surface thereof that is in contact with the second diaphragm 38. Accordingly, the area of the thin membrane-shaped portion 36c, which is a deformed region of the first diaphragm 36, is greater than the area of the thin membrane-shaped portion 38c, which is a deformed region of the second diaphragm 38. Stated otherwise, the effective pressure receiving area of the first diaphragm 36 is greater than the effective pressure receiving area of the second diaphragm 38. The technical significance of such a difference in the effective pressure receiving areas will be described later.

The valve element accommodating chamber 20 is partitioned into a valve chamber 44 formed above the first diaphragm 36, a diaphragm chamber 46 formed between the first diaphragm 36 and the second diaphragm 38, and the back pressure chamber 48 formed below the second diaphragm 38. The valve chamber 44 communicates with the input port 16 via the input passage 14a. The term "valve chamber" referred to in the present invention is a chamber that is in close proximity to the valve seat 22, and that constitutes a part of a passage through which the fluid flows from the input port 16 to the output port 18.

The first spacer 40 includes a plurality of radial holes 40a that penetrate therethrough in a radial direction. One ends of the plurality of radial holes 40a are open to the diaphragm chamber 46. The main valve element 28 includes an annular groove 28d that encircles an outer circumferential surface of the small diameter portion 28c, a plurality of radial holes 28e having one ends connected to the annular groove 28d, and a shaft hole 28f connected to other ends of the plurality of radial holes 28e. The shaft hole 28f extends in an axial direction of the main valve element 28 until arriving at the stem hole 28g. The stem 34 includes a radial hole 34a that penetrates therethrough in a radial direction and is open in the output passage 14b at both ends thereof, and a shaft hole 34b that communicates with the radial hole 34a and extends to a lower end of the stem 34.

The other ends of the radial holes 40a of the first spacer 40 are connected to the annular groove 28d of the main valve element 28. An upper end of the shaft hole 28f of the main valve element 28 faces a lower end of the shaft hole 34b of the stem 34. The radial holes 40a of the first spacer 40, the annular groove 28d of the main valve element 28, the radial holes 28e of the main valve element 28, the shaft hole 28f of the main valve element 28, the shaft hole 34b of the stem 34, and the radial hole 34a of the stem 34 constitute a secondary pressure introduction passage through which the pressure of the fluid in the output port 18 is introduced into the diaphragm chamber 46. More specifically, the diaphragm chamber 46 communicates with the output port 18 via the secondary pressure introduction passage and the output passage 14b.

The fitting portion 24a of the cover body 24 includes an annular groove 24b that encircles an outer circumferential surface of the fitting portion 24a, and a plurality of lateral holes 24c, one ends of which are connected to the annular groove 24b, and the other ends of which are open to the back pressure chamber 48. The main body portion 14 includes a communication passage 14f, one end of which is connected to the annular groove 24b of the cover body 24, and the other end of which is connected to the input port 16. The lateral holes 24c of the cover body 24, the annular groove 24b of the cover body 24, and the communication passage 14f of the main body portion 14 constitute a primary pressure introduction passage through which the pressure of the fluid in the input port 16 is introduced into the back pressure chamber 48. More specifically, the back pressure chamber 48 communicates with the input port 16 via the primary pressure introduction passage. It should be noted that the primary pressure introduction passage is maintained airtight from the exterior by a seal member 51 arranged between the main body portion 14 and the cover body 24.

The cylindrical bonnet 52 is installed on an upper end part of the main body portion 14, and extends upwardly from the main body portion 14. The annular pressure regulating diaphragm 60, which is made entirely from an elastic material and is formed in a thin membrane shape, is disposed between the main body portion 14 and the bonnet 52. An outer circumferential portion 60b of the pressure regulating diaphragm 60 is sandwiched between an upper surface of the main body portion 14 and a lower surface of the bonnet 52. A base holder 64 is inserted in the center of the pressure regulating diaphragm 60, and a disk shaped retaining plate 66 is installed on the base holder 64. An inner circumferential portion 60a of the pressure regulating diaphragm 60 is sandwiched between the base holder 64 and the retaining plate 66.

The base holder 64 includes a recessed portion 64a in the center of a lower part thereof. An upper end part of the stem 34, which protrudes from the main body portion 14, is inserted into the recessed portion 64a. The upper end of the stem 34 abuts against the base holder 64 via a seal member 65 that is mounted in the recessed portion 64a. When the base holder 64 is displaced in the vertical direction, a region between the inner circumferential portion 60a and the outer circumferential portion 60b of the pressure regulating diaphragm 60 is deformed.

A pressure regulating diaphragm chamber 62 is disposed below the pressure regulating diaphragm 60. The pressure regulating diaphragm chamber 62 communicates with the output passage 14b via a bypass passage 14g of the main body portion 14. More specifically, the pressure regulating diaphragm chamber 62 communicates with the output port 18 via the bypass passage 14g and the output passage 14b. By the aforementioned seal member 65 that is mounted on the base holder 64, the pressure regulating diaphragm chamber 62 is maintained airtight from the interior of the bonnet 52 which expands above the pressure regulating diaphragm 60.

The pressure regulating shaft 54, the pressure regulating spring 58, and a pressure regulating spring seat 56 are disposed in the interior of the bonnet 52. The pressure regulating shaft 54 includes a flange portion 54a in proximity to a center in the axial direction thereof, and includes a threaded portion 54b on the lower side of the flange portion 54a. An upper end part of the pressure regulating shaft 54 protrudes upwardly from the bonnet 52, and is connected to a handle 68 that covers an upper part of the bonnet 52. More specifically, a bottom part of the bottomed cylindrical handle 68 is equipped with a cylindrical protruding portion 68a, and the upper end part of the pressure regulating shaft 54 is fixed to the cylindrical protruding portion 68a by means of press fitting or the like.

The pressure regulating spring seat 56 is arranged below the flange portion 54a of the pressure regulating shaft 54. The pressure regulating spring seat 56 is formed of an annular plate portion 56a that is capable of abutting against the flange portion 54a of the pressure regulating shaft 54, and a cylindrical portion 56b that extends in the axial direction from an inner circumferential edge of the plate portion 56a. The cylindrical portion 56b of the pressure regulating spring seat 56 is screw-engaged with the threaded portion 54b of the pressure regulating shaft 54. An outer circumference of the plate portion 56a of the pressure regulating spring seat 56 is connected to the bonnet 52 by a rotation preventing unit such as a spline or the like. Accordingly, the pressure regulating spring seat 56 is supported by the bonnet 52 so as to be capable of being displaced in the axial direction (vertical direction) while rotation thereof about the axis is restricted.

The pressure regulating spring 58 is formed of a coil spring, and is arranged between the pressure regulating spring seat 56 and the retaining plate 66. A spring constant of the pressure regulating spring 58 is greater than a spring constant of the valve spring 50. When the pressure regulating shaft 54 is rotated by an operator rotating the handle 68, the pressure regulating spring seat 56 is displaced in the vertical direction, and the retaining plate 66 and the base holder 64 are also displaced in the same direction.

In this instance, a vertical force based on the pressure of the fluid and acting on the valve element 26 is taken into consideration. The pressure at the input port 16 will be referred to as a primary pressure P1, and the pressure at the output port 18 will be referred to as a secondary pressure P2. Further, the effective pressure receiving area of the first diaphragm 36 is defined as Sa, the effective pressure receiving area of the second diaphragm 38 is defined as Sb, and a circular passage area in the valve seat 22 (a seat area of the valve seat 22) is defined as Sc. Furthermore, the cross-sectional area of the small diameter portion 28c of the main valve element 28 that supports the inner circumferential portion 36a of the first diaphragm 36 and the inner circumferential portion 38a of the second diaphragm 38 is defined as S1.

Since the valve chamber 44 communicates with the input port 16 via the input passage 14a, the pressure of the fluid in the valve chamber 44 is equivalent to the primary pressure P1. Further, since the diaphragm chamber 46 communicates with the output port 18 via the secondary pressure introduction passage and the output passage 14b, the pressure of the fluid in the diaphragm chamber 46 is equivalent to the secondary pressure P2. Furthermore, since the back pressure chamber 48 communicates with the input port 16 via the primary pressure introduction passage, the pressure of the fluid in the back pressure chamber 48 is equivalent to the primary pressure P1.

The first diaphragm 36 receives the pressure of the fluid in the valve chamber 44 and the pressure of the fluid in the diaphragm chamber 46. Therefore, the valve element 26 that is connected to the first diaphragm 36 receives a downward force of $P1 \times (Sa-Sc)$, which is due to the pressure in the valve chamber 44, and also receives an upward force of $P2 \times (Sa-S1)$, which is due to the pressure in the diaphragm chamber 46.

The second diaphragm 38 receives the pressure of the fluid in the diaphragm chamber 46 and the pressure of the fluid in the back pressure chamber 48. Therefore, the valve element 26 that is connected to the second diaphragm 38 receives a downward force of $P2 \times (Sb-S1)$, which is due to the pressure in the diaphragm chamber 46, and also receives an upward force of $P1 \times Sb$, which is due to the pressure in the back pressure chamber 48. Further, the valve element 26 receives a downward force of $P2 \times Sc$ from an upper surface of the main valve element 28 that faces the output passage 14b.

The forces that act on the valve element 26 due to the pressure of the fluid are as described above. When the sign of an upward force is positive, the sign of a downward force is negative, and all of such forces are added and collected together, the expression $(P1-P2) \times (-Sa+Sb+Sc)$ is brought about.

In order for the sum of the forces that act on the valve element 26 due to the pressure of the fluid (hereinafter referred to as a "sum of forces acting on the valve element") to be substantially zero, the equation $Sa-Sb=Sc$ is set. More specifically, the effective pressure receiving area Sa of the first diaphragm 36 and the effective pressure receiving area Sb of the second diaphragm 38 are set in a manner so that the difference between the effective pressure receiving area Sa of the first diaphragm 36 and the effective pressure receiving area Sb of the second diaphragm 38 becomes equivalent to the passage area Sc in the valve seat 22. By performing setting in this manner, regardless of the magnitudes of the primary pressure P1 and the secondary pressure P2, the sum of forces acting on the valve element can be made substantially zero. Accordingly, even if one or both of the primary pressure P1 and the secondary pressure P2 fluctuate, a force that brings about an instability in operation is not applied to the valve element 26.

Next, a description will be given concerning setting of the secondary pressure by the handle 68, and a pressure regulating action performed by the pressure regulating mechanism. Since the pressure regulating diaphragm chamber 62 communicates with the output port 18 via the bypass passage 14g and the output passage 14b, the pressure of the fluid in the pressure regulating diaphragm chamber 62 is equivalent to the secondary pressure P2. The pressure regulating diaphragm 60 receives the pressure in the pressure regulating diaphragm chamber 62, and applies an upward force to the base holder 64 that supports the inner circumferential portion 60a of the pressure regulating diaphragm 60.

The pressure regulating spring 58 applies a downward force to the base holder 64. The base holder 64 abuts against the stem 34, and the valve spring 50 applies an upward force to the base holder 64 via the valve element 26. The downward force due to the pressure regulating spring 58 and the upward force due to the valve spring 50 are determined by the position of the base holder 64. A force obtained by subtracting the biasing force of the valve spring 50 from the biasing force of the pressure regulating spring 58 can be adjusted by rotating the handle 68. As the position of the base holder 64 is made lower, it is possible to set the secondary pressure to a larger value.

When a fluid pressure device (not shown) connected to the output port 18 is placed in a dormant state or a stopped state, and a pressure fluid is not being supplied to the input port 16, the main valve element 28 is significantly separated away from the valve seat 22. When operation of the fluid pressure device is started from such a state and the fluid is supplied to the input port 16 from a fluid supply source (not shown), the fluid passes between the valve seat 22 and the main valve element 28, and flows toward the output port 18.

Consequently, the secondary pressure gradually rises, and the pressure in the pressure regulating diaphragm chamber 62 also gradually rises.

As the pressure in the pressure regulating diaphragm chamber 62 rises, the base holder 64 is displaced upward, and the flow rate of the fluid flowing from the input port 16 toward the output port 18 decreases. Then, when the secondary pressure reaches the pressure set by the handle 68, the main valve element 28 abuts against the valve seat 22, flowing of the fluid toward the output port 18 is stopped, and displacement of the base holder 64 is also stopped. Thereafter as well, the pressure regulating action is carried out by the pressure regulating mechanism, in a manner so that the secondary pressure is maintained at the pressure that has been set by the handle 68.

As was noted previously, even if one or both of the primary pressure P1 and the secondary pressure P2 fluctuate, the sum of forces acting on the valve element remains at substantially zero. Accordingly, a balance between the forces required in order to maintain the desired secondary pressure that has been set by the operator operating the handle 68 is not lost. Consequently, a stable pressure regulating action is performed, and the pressure at the output port 18 is maintained at the desired secondary pressure.

According to the present embodiment, the difference between the effective pressure receiving area Sa of the first diaphragm 36 and the effective pressure receiving area Sb of the second diaphragm 38 is equivalent to the passage area Sc in the valve seat 22. Therefore, even if the primary pressure or the secondary pressure fluctuates, a stable pressure regulating action can be performed, and a desired secondary pressure can be obtained. Further, under a state in which a sliding portion that requires a seal member does not exist, the valve element 26 is supported so as to be capable of being displaced in the axial direction. Therefore, operations that become unstable due to sliding resistance do not occur, and dust or debris is not generated due to such sliding movement.

In the present embodiment, the diaphragm chamber 46 communicates with the output port 18, and the valve chamber 44 and the back pressure chamber 48 communicate with the input port 16, but the diaphragm chamber 46 may communicate with the input port 16, and the valve chamber 44 and the back pressure chamber 48 may communicate with the output port 18. This is because, in that case, the sum of forces that act on the valve element 26 is indicated by the above-described expression (P1−P2)×(−Sa+Sb+Sc) in which P1 and P2 are switched, and the condition (Sa−Sb=Sc) for making the value of the sum zero is the same.

Second Embodiment

Figure 3:
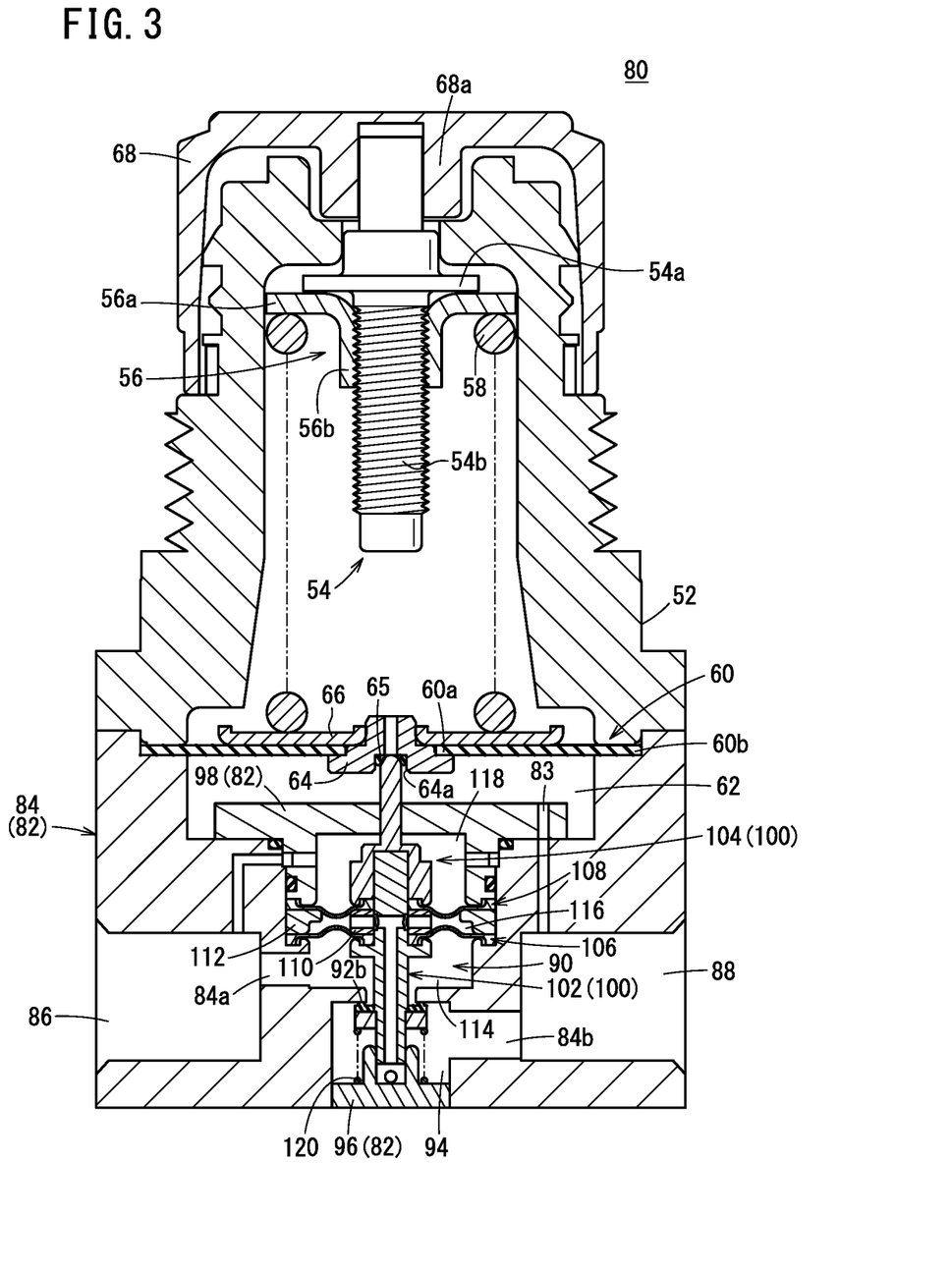
FIG. 3 is a cross-sectional view of a fluid control valve according to a second embodiment of the present invention.
Figure 4:
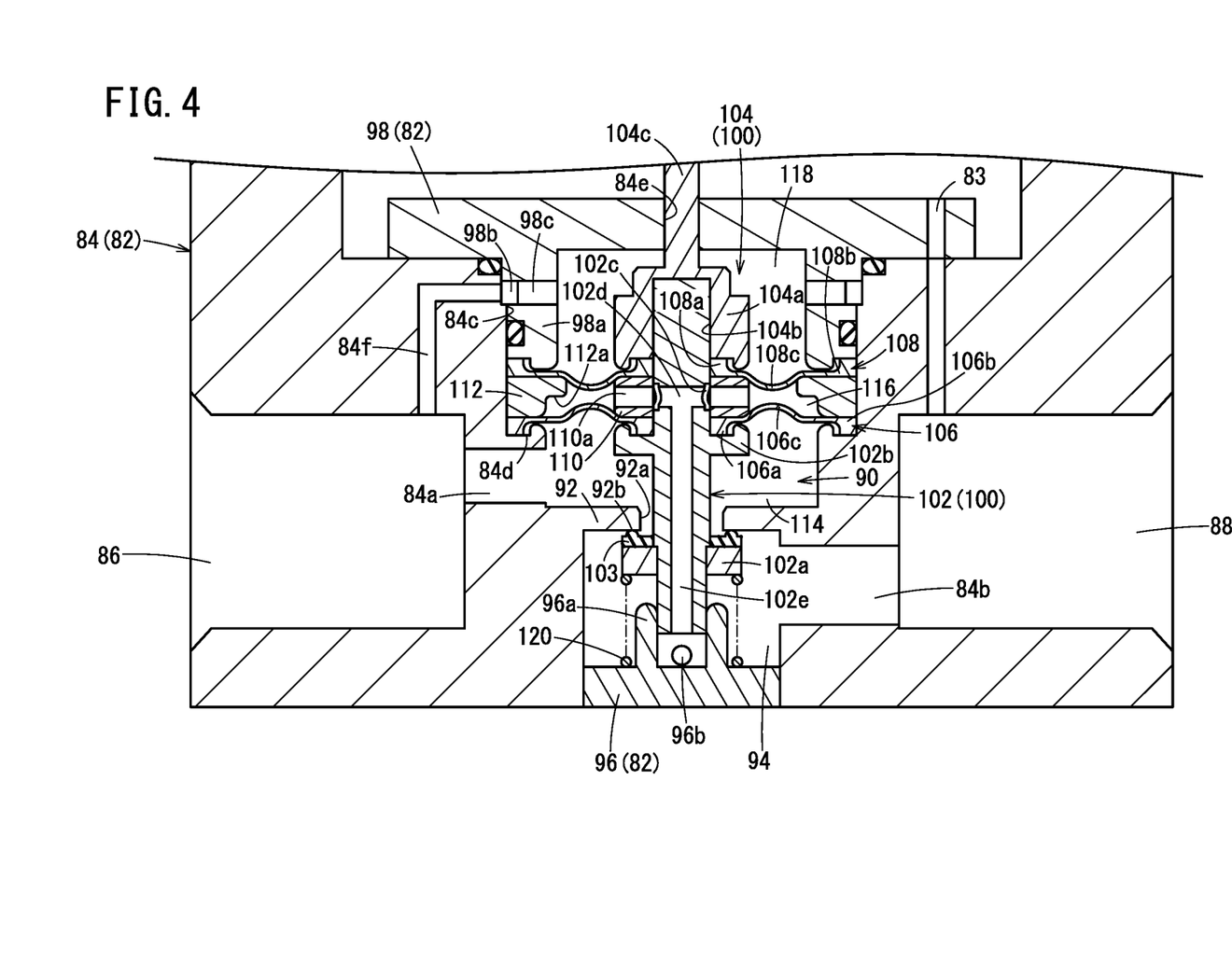
FIG. 4 is a partially enlarged view of the fluid control valve shown in FIG. 3.

Next, a description will be given with reference to FIGS. 3 and 4 concerning a fluid control valve 80 according to a second embodiment of the present invention. The fluid control valve 80 functions as a pressure regulator. The fluid control valve 80 includes a body 82, the bonnet 52, and in the interior of these elements, a balancing mechanism and a pressure regulating mechanism. The balancing mechanism is constituted by a valve element 100, a first diaphragm 106, a second diaphragm 108, and the like. The body 82 is formed of a main body portion 84, a first cover body 96, and a second cover body 98, and the valve element 100 is formed of a main valve element 102 and an additional valve element 104. It should be noted that constituent elements which are the same or equivalent to those of the fluid control valve 10 according to the first embodiment are denoted by the same reference numerals, and detailed description thereof is omitted.

The main body portion 84 includes an input port 86 and an output port 88 which are arranged to face each other on the same axis. The first cover body 96 is installed on a lower part of the main body portion 84, and the second cover body 98 is installed on an upper part of the main body portion 84. The main body portion 84 includes, in the interior thereof, a valve element accommodating chamber 90 in which the valve element 100 is accommodated. The valve element accommodating chamber 90 communicates with the input port 86 via an input passage 84a, and also communicates with the output port 88 via an output passage 84b.

The main body portion 84 includes a horizontal wall portion 92 having an opening 92a through which the main valve element 102 is inserted. The horizontal wall portion 92 protrudes into the valve element accommodating chamber 90, and an output chamber 94 connected to the output passage 84b is positioned below the horizontal wall portion 92. The horizontal wall portion 92 is equipped with a valve seat 92b on a lower surface thereof in the vicinity of the opening 92a. The first cover body 96 includes a cylindrical guide member 96a that protrudes toward the output chamber 94, and is fitted to a lower part of the main body portion 84. Via a through hole 96b provided in the guide member 96a of the first cover body 96, the fluid in the output chamber 94 flows in an encircling manner around an inner side of the guide member 96a.

The second cover body 98 includes a downwardly projecting cylindrical fitting portion 98a, and the fitting portion 98a is fitted into a fitting hole 84c provided in an upper part of the main body portion 84. A lower end of the fitting portion 98a of the second cover body 98 faces toward a stepped portion 84d with a predetermined gap therebetween, the stepped portion 84d being contiguous with the fitting hole 84c of the main body portion 84. In such a gap, as will be described later, there are arranged an outer circumferential portion 106b of the first diaphragm 106, a second spacer 112, and an outer circumferential portion 108b of the second diaphragm 108.

The main valve element 102 includes a first flange portion 102a positioned below the horizontal wall portion 92 of the main body portion 84, and a second flange portion 102b positioned above the horizontal wall portion 92. A seal member 103 that abuts against the valve seat 92b is mounted on an upper surface of the first flange portion 102a. A portion of the main valve element 102 that is located below the first flange portion 102a is inserted and supported on an inner side of the guide member 96a of the first cover body 96. A valve spring 120 is disposed between a lower surface of the first flange portion 102a and a bottom surface of the first cover body 96, so as to surround the outer side of the guide member 96a of the first cover body 96. The valve spring 120 is formed of a coil spring and biases the main valve element 102 upward.

The additional valve element 104 is connected to the main valve element 102. More specifically, the additional valve element 104 includes a large diameter portion 104a having a connecting hole 104b, and a small diameter portion 104c that extends upwardly from the large diameter portion 104a. An upper part of the main valve element 102 is inserted into the connecting hole 104b of the additional valve element 104, and the two members are connected by means of screw-engagement or the like. The small diameter portion 104c of the additional valve element 104 is inserted into a valve element insertion hole 84e of the second cover body 98, and extends into the pressure regulating diaphragm chamber 62 that is disposed above the second cover body 98.

An upper surface of the second flange portion 102b of the main valve element 102 faces toward a lower end of the large diameter portion 104a of the additional valve element 104 with a predetermined gap therebetween. In such a gap, as will be described later, there are arranged an inner circumferential portion 106a of the first diaphragm 106, a first spacer 110, and an inner circumferential portion 108a of the second diaphragm 108. The main valve element 102 and the additional valve element 104 are integrally supported so as to be capable of being displaced in the axial direction (vertical direction).

In the interior of the valve element accommodating chamber 90, the first diaphragm 106 and the second diaphragm 108 are arranged between the valve element 100 and the body 82. Both of the diaphragms are formed from an elastic material in an annular thin membrane shape. The first spacer 110 having a ring shape is arranged between the inner circumferential portion 106a of the first diaphragm 106 and the inner circumferential portion 108a of the second diaphragm 108. The second spacer 112 having a ring shape is arranged between the outer circumferential portion 106b of the first diaphragm 106 and the outer circumferential portion 108b of the second diaphragm 108.

The first diaphragm 106, the first spacer 110, and the second diaphragm 108 are inserted through a portion of the main valve element 102 that is located above the second flange portion 102b. The inner circumferential portion 106a of the first diaphragm 106 is sandwiched between the second flange portion 102b of the main valve element 102 and a lower surface of the first spacer 110. The inner circumferential portion 108a of the second diaphragm 108 is sandwiched between an upper surface of the first spacer 110 and a lower end of the additional valve element 104. The outer circumferential portion 106b of the first diaphragm 106 is sandwiched between the stepped portion 84d of the main body portion 84 and a lower surface of the second spacer 112. The outer circumferential portion 108b of the second diaphragm 108 is sandwiched between an upper surface of the second spacer 112 and a lower end of the fitting portion 98a of the second cover body 98.

When the valve element 100 is displaced in the vertical direction, the inner circumferential portion 106a of the first diaphragm 106 is displaced together with the valve element 100, and a thin membrane-shaped portion 106c between the inner circumferential portion 106a and the outer circumferential portion 106b of the first diaphragm 106 is deformed. Similarly, when the valve element 100 is displaced in the vertical direction, the inner circumferential portion 108a of the second diaphragm 108 is displaced together with the valve element 100, and a thin membrane-shaped portion 108c between the inner circumferential portion 108a and the outer circumferential portion 108b of the second diaphragm 108 is deformed.

The second spacer 112 includes a stepped portion 112a on an inner circumference thereof. The inner diameter of the second spacer 112 is formed to be greater in the vicinity of the lower surface thereof that is in contact with the first diaphragm 106 than in the vicinity of the upper surface thereof that is in contact with the second diaphragm 108. Accordingly, the area of the thin membrane-shaped portion 106c, which is a deformed region of the first diaphragm 106, is greater than the area of the thin membrane-shaped portion 108c, which is a deformed region of the second diaphragm 108. Stated otherwise, the effective pressure receiving area of the first diaphragm 106 is greater than the effective pressure receiving area of the second diaphragm 108. The technical significance of such a difference in the effective pressure receiving areas will be described later.

Above the horizontal wall portion 92 of the main body portion 84, the valve element accommodating chamber 90 is partitioned into a valve chamber 114 formed below the first diaphragm 106, a diaphragm chamber 116 formed between the first diaphragm 106 and the second diaphragm 108, and a back pressure chamber 118 formed above the second diaphragm 108. The valve chamber 114 communicates with the input port 86 via the input passage 84a.

The first spacer 110 includes a plurality of radial holes 110a that penetrate therethrough in a radial direction. One ends of the plurality of radial holes 110a are open to the diaphragm chamber 116. At a location above the second flange portion 102b, the main valve element 102 includes an annular groove 102c that encircles the outer circumferential surface, a plurality of radial holes 102d having one ends connected to the annular groove 102c, and a shaft hole 102e connected to other ends of the plurality of radial holes 102d. The shaft hole 102e extends in the axial direction of the main valve element 102 to a lower end of the main valve element 102. The other ends of the radial holes 110a of the first spacer 110 are connected to the annular groove 102c of the main valve element 102.

The radial holes 110a of the first spacer 110, the annular groove 102c of the main valve element 102, the radial holes 102d of the main valve element 102, and the shaft hole 102e of the main valve element 102 constitute a secondary pressure introduction passage through which the pressure of the fluid in the output port 88 is introduced into the diaphragm chamber 116. More specifically, the diaphragm chamber 116 communicates with the output port 88 via the secondary pressure introduction passage, the output chamber 94, and the output passage 84b.

The fitting portion 98a of the second cover body 98 includes an annular groove 98b that encircles an outer circumferential surface of the fitting portion 98a, and a plurality of lateral holes 98c, one ends of which are connected to the annular groove 98b, and the other ends of which are open to the back pressure chamber 118. Further, the main body portion 84 includes a communication passage 84f, one end of which is connected to the annular groove 98b of the second cover body 98, and the other end of which is connected to the input port 86. The lateral holes 98c of the second cover body 98, the annular groove 98b of the second cover body 98, and the communication passage 84f of the main body portion 84 constitute a primary pressure introduction passage through which the pressure of the fluid in the input port 86 is introduced into the back pressure chamber 118. More specifically, the back pressure chamber 118 communicates with the input port 86 via the primary pressure introduction passage.

In this instance, a vertical force based on the pressure of the fluid and acting on the valve element 100 is taken into consideration. The pressure at the input port 86 will be referred to as a primary pressure P1, and the pressure at the output port 88 will be referred to as a secondary pressure P2. Further, the effective pressure receiving area of the first diaphragm 106 is defined as Sa, the effective pressure receiving area of the second diaphragm 108 is defined as Sb, and a circular passage area in the valve seat 92b (a seat area of the valve seat 92b) is defined as Sc. Further, the cross-sectional area of the main valve element 102 that supports the inner circumferential portion 106a of the first diaphragm 106 and the inner circumferential portion 108a of the second diaphragm 108 is defined as S1. Furthermore, the cross-sectional area of the valve element insertion hole 84e of the second cover body 98 (the cross-sectional area of the small diameter portion 104c of the additional valve element 104 serving as the cross-sectional area of one end part of the valve element 100) is defined as S2.

Since the valve chamber 114 communicates with the input port 86 via the input passage 84a, the pressure of the fluid in the valve chamber 114 is equivalent to the primary pressure P1. Further, since the diaphragm chamber 116 communicates with the output port 88 via the secondary pressure introduction passage, the output chamber 94, and the output passage 84b, the pressure of the fluid in the diaphragm chamber 116 is equivalent to the secondary pressure P2. Furthermore, since the back pressure chamber 118 communicates with the input port 86 via the primary pressure introduction passage, the pressure of the fluid in the back pressure chamber 118 is equivalent to the primary pressure P1. In addition, since the pressure regulating diaphragm chamber 62 communicates with the output port 88 via the main body portion 84 and a bypass passage 83 provided in the second cover body 98, the pressure of the fluid in the pressure regulating diaphragm chamber 62 is equivalent to the secondary pressure P2.

The first diaphragm 106 receives the pressure of the fluid in the valve chamber 114 and the pressure of the fluid in the diaphragm chamber 116. Therefore, the valve element 100 that is connected to the first diaphragm 106 receives an upward force of P1×(Sa−Sc), which is due to the pressure in the valve chamber 114, and also receives a downward force of P2×(Sa−S1), which is due to the pressure in the diaphragm chamber 116.

The second diaphragm 108 receives the pressure of the fluid in the diaphragm chamber 116 and the pressure of the fluid in the back pressure chamber 118. Therefore, the valve element 100 that is connected to the second diaphragm 108 receives an upward force of P2×(Sb−S1), which is due to the pressure in the diaphragm chamber 116, and also receives a downward force of P1×(Sb−S2), which is due to the pressure in the back pressure chamber 118. Further, since the lower end of the main valve element 102 faces the output chamber 94, the valve element 100 receives an upward force of P2×Sc, and since the upper end of the additional valve element 104 faces the pressure regulating diaphragm chamber 62, the valve element 100 also receives a downward force of P2×S2.

The forces that act on the valve element 100 due to the pressure of the fluid are as described above. When the sign of an upward force is positive, the sign of a downward force is negative, and all of such forces are added and collected together, the expression (P1−P2)×(Sa−Sb−Sc+S2) is brought about.

In order for the sum of the forces that act on the valve element 100 due to the pressure of the fluid (hereinafter referred to as a "sum of forces acting on the valve element") to be substantially zero, the equation Sa−Sb=Sc−S2 is set. More specifically, the effective pressure receiving area Sa of the first diaphragm 106 and the effective pressure receiving area Sb of the second diaphragm 108 are set in a manner so that the difference between the effective pressure receiving area Sa of the first diaphragm 106 and the effective pressure receiving area Sb of the second diaphragm 108 becomes equivalent to the difference between the passage area Sc in the valve seat 92b and the cross-sectional area S2 of the additional valve element 104 that protrudes into the pressure regulating diaphragm chamber 62. By performing setting in this manner, regardless of the magnitudes of the primary pressure P1 and the secondary pressure P2, the sum of forces acting on the valve element can be made substantially zero. Accordingly, even if one or both of the primary pressure P1 and the secondary pressure P2 fluctuate, a force that brings about an instability in operation is not applied to the valve element 100.

Third Embodiment

Figure 5:
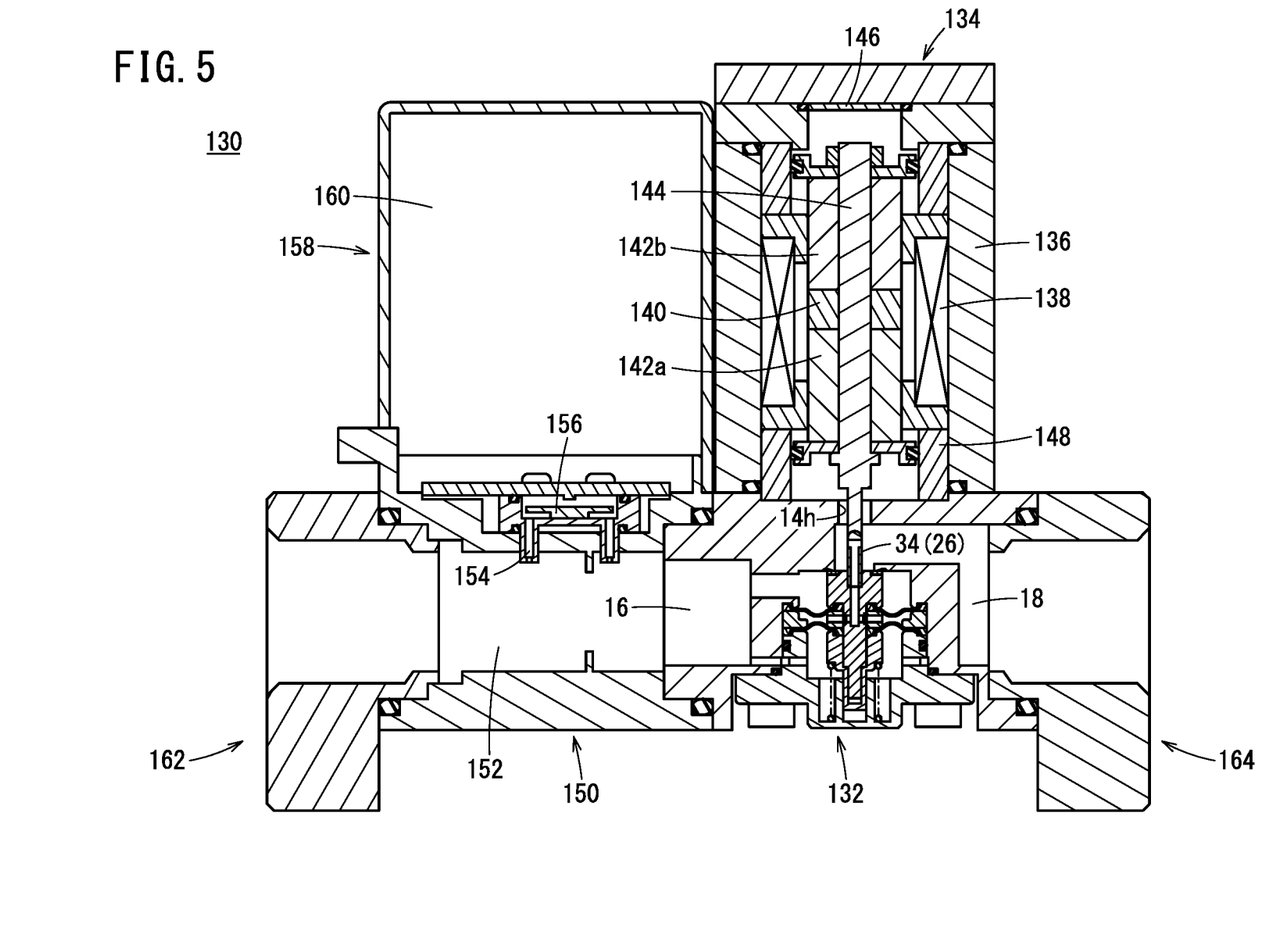
FIG. 5 is a schematic cross-sectional view of a fluid control valve according to a third embodiment of the present invention.
Figure 6:
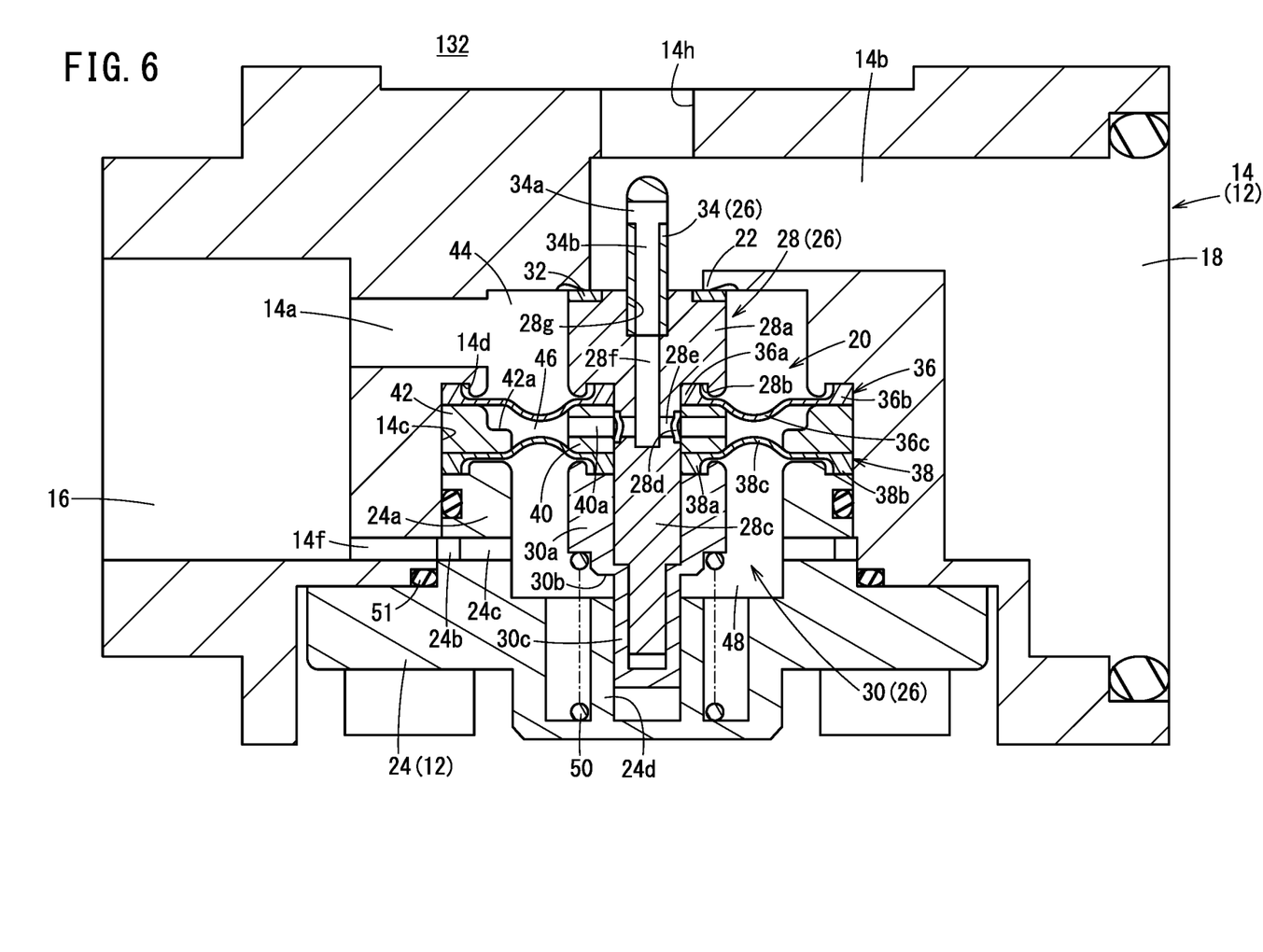
FIG. 6 is an enlarged view of a valve module of the fluid control valve shown in FIG. 5.

Next, a description will be given with reference to FIGS. 5 and 6 concerning a fluid control valve 130 according to a third embodiment of the present invention. The fluid control valve 130 functions as a flow rate control valve. The fluid control valve 130 is formed of a valve module 132, an actuator module 134, a sensor module 150, a control module 158, an inlet module 162, and an outlet module 164. It should be noted that constituent elements which are the same or equivalent to those of the fluid control valve 10 according to the first embodiment are denoted by the same reference numerals, and detailed description thereof is omitted.

The valve module 132 includes a balancing mechanism that is constituted by the valve element 26, the first diaphragm 36, the second diaphragm 38 and the like that are incorporated in the body 12. The body 12 is formed of the main body portion 14 and the cover body 24, and the valve element 26 is formed of the main valve element 28, the additional valve element 30, and the stem 34.

The main body portion 14 includes the input port 16 and the output port 18 which are arranged to face each other on the same axis. The cover body 24 is installed on a lower part of the main body portion 14. The main body portion 14 includes the valve element accommodating chamber 20 that is closed by the cover body 24. The upper part of the valve element accommodating chamber 20 communicates with the input port 16 via the input passage 14a, and also communicates with the output port 18 via the output passage 14b.

The upper end of the stem 34 is positioned inside the output passage 14b. The main body portion 14 includes a hole 14h allowing communication between the output passage 14b and a space above the main body portion 14. The hole 14h is arranged coaxially with the stem 34. A shaft 144 of a linear motor, which will be described later, is inserted through the hole 14h, and abuts against the upper end of the stem 34.

The valve element accommodating chamber 20 is partitioned into the valve chamber 44 formed above the first diaphragm 36, the diaphragm chamber 46 formed between the first diaphragm 36 and the second diaphragm 38, and the back pressure chamber 48 formed below the second diaphragm 38. The valve chamber 44 communicates with the input port 16 via the input passage 14a.

The radial holes 40a of the first spacer 40, the annular groove 28d of the main valve element 28, the radial holes 28e of the main valve element 28, the shaft hole 28f of the main valve element 28, the shaft hole 34b of the stem 34, and the radial hole 34a of the stem 34 constitute a secondary pressure introduction passage through which the pressure of the fluid in the output port 18 is introduced into the diaphragm chamber 46. The diaphragm chamber 46 communicates with the output port 18 via the secondary pressure introduction passage and the output passage 14b.

The lateral holes 24c of the cover body 24, the annular groove 24b of the cover body 24, and the communication passage 14f of the main body portion 14 constitute a primary pressure introduction passage through which the pressure of the fluid in the input port 16 is introduced into the back pressure chamber 48. The back pressure chamber 48 communicates with the input port 16 via the primary pressure introduction passage.

A vertical force based on the pressure of the fluid and acting on the valve element 26 is the same as that of the fluid control valve 10 according to the first embodiment, and is briefly described as follows. The pressure at the input port 16 will be referred to as a primary pressure P1, and the pressure at the output port 18 will be referred to as a secondary pressure P2. Further, the effective pressure receiving area of the first diaphragm 36 is defined as Sa, the effective pressure receiving area of the second diaphragm 38 is defined as Sb, and a circular passage area in the valve seat 22 (a seat area of the valve seat 22) is defined as Sc. The sum of forces acting on the valve element, which is obtained by adding all of forces that act on the valve element 26 due to the pressure of the fluid, is defined by the expression (P1−P2)×(−Sa+Sb+Sc).

In order for the sum of forces acting on the valve element to be substantially zero, the equation Sa−Sb=Sc is set. More specifically, the effective pressure receiving area Sa of the first diaphragm 36 and the effective pressure receiving area Sb of the second diaphragm 38 are set in a manner so that the difference between the effective pressure receiving area Sa of the first diaphragm 36 and the effective pressure receiving area Sb of the second diaphragm 38 becomes equivalent to the passage area Sc in the valve seat 22. By performing setting in this manner, regardless of the magnitudes of the primary pressure P1 and the secondary pressure P2, the sum of forces acting on the valve element can be made substantially zero. Accordingly, even if one or both of the primary pressure P1 and the secondary pressure P2 fluctuate, a force that brings about an instability in operation is not applied to the valve element 26.

The actuator module 134 is disposed above the valve module 132 and constitutes a linear motor. A stator of the linear motor includes an outer yoke 136 installed on the body 12 of the valve module 132, and an electromagnetic coil 138 fixed to an inner side of the outer yoke 136.

A movable element of the linear motor is configured by fixing a center yoke 140 and a pair of permanent magnets 142a and 142b to the shaft 144. The pair of permanent magnets 142a and 142b, which are magnetized in an axial direction (vertical direction) are arranged so that the same poles thereof face each other with the center yoke 140 interposed therebetween. When a drive current flows through the electromagnetic coil 138, an upward or downward thrust is generated in the permanent magnets 142a and 142b and the center yoke 140 according to the direction in which the drive current flows. The magnitude of the thrust is proportional to the magnitude of the drive current.

A position sensor 146 formed of a Hall element, a magnetoresistive element, and the like is disposed above the movable element. The position of the movable element is detected by the position sensor 146, and a detection signal thereof is transmitted to the control module 158. A hold yoke 148 is disposed below the movable element. Even at a time when current is not being supplied to the electromagnetic coil 138, an attractive force acts between the lower permanent magnet 142a and the hold yoke 148. Consequently, a state in which a lower end of the shaft 144 abuts against the stem 34 is maintained.

The sensor module 150 is installed in the input port 16 of the valve module 132. The sensor module 150 includes a main flow path 152 connected to the input port 16 of the valve module 132, an auxiliary flow path 154 that branches off from the main flow path 152, and a flow rate sensor 156 facing the auxiliary flow path 154. The flow rate sensor 156 detects the flow rate of the fluid flowing through the main flow path 152, and a detection signal thereof is transmitted to the control module 158.

The inlet module 162 is installed on an upstream side of the main flow path 152 of the sensor module 150. The outlet module 164 is installed in the output port 18 of the valve module 132. The fluid, which is supplied to the inlet module 162 from a pressure supply source (not shown), passes through the main flow path 152 of the sensor module 150, and is supplied to the input port 16 of the valve module 132. The fluid that is output from the output port 18 of the valve module 132 passes through the outlet module 164, and is output toward a fluid device (not shown). The flow rate of the fluid flowing from the input port 16 toward the output port 18 is detected by the flow rate sensor 156.

Based on the detection signal of the flow rate sensor 156 and the detection signal of the position sensor 146, the control module 158, which is equipped with a control board 160, feedback-controls the amount of current supplied to the electromagnetic coil 138. More specifically, at first, an actual flow rate value based on the detection signal of the flow rate sensor 156 is compared with a target flow rate value to calculate a target valve opening degree (a target position of the valve element). Next, an actual valve opening degree based on the position sensor 146 is compared with the target valve opening degree to calculate the amount of current to be supplied to the electromagnetic coil 138, and a drive signal that enables a predetermined drive current to flow through the electromagnetic coil 138 is output.

As noted previously, even if one or both of the primary pressure P1 and the secondary pressure P2 fluctuate, a force that brings about an instability in operation is not applied to the valve element 26. Therefore, the control of supplying current to the electromagnetic coil 138 of the linear motor is performed in a stable manner without being affected by so-called disturbances. Accordingly, heat generation by the electromagnetic coil 138 can be suppressed as much as possible.

According to the present embodiment, the difference between the effective pressure receiving area Sa of the first diaphragm 36 and the effective pressure receiving area Sb of the second diaphragm 38 is equivalent to the passage area Sc in the valve seat 22. Therefore, even if the primary pressure or the secondary pressure fluctuates, a force that brings about an instability in operation is not applied to the valve element 26, and heat generation by the electromagnetic coil 138 of the linear motor can be suppressed as much as possible.

The fluid control valve according to the present invention is not limited to the embodiments described above, and various configurations may be adopted therein without deviating from the scope of the present invention.

What is claimed is:
1. A fluid control valve comprising:
a body including an input port and an output port; and
a valve element configured to abut against a valve seat of the body, wherein
a first diaphragm and a second diaphragm are disposed between the valve element and the body,
a diaphragm chamber is formed between the first diaphragm and the second diaphragm,
the first diaphragm separates a valve chamber from the diaphragm chamber,
the second diaphragm separates the diaphragm chamber from a back pressure chamber, the diaphragm chamber communicates with the output port, the valve chamber and the back pressure chamber communicate with the input port, and a difference between an effective pressure receiving area of the first diaphragm and an effective pressure receiving area of the second diaphragm is equivalent to a passage area in the valve seat.

2. The fluid control valve according to claim 1, wherein a spacer is disposed between an inner circumferential portion of the first diaphragm and an inner circumferential portion of the second diaphragm, and the diaphragm chamber communicates with the output port via the spacer and a secondary pressure introduction passage provided in the valve element.

3. The fluid control valve according to claim 1, wherein a spacer is disposed between an outer circumferential portion of the first diaphragm and an outer circumferential portion of the second diaphragm, and by providing a stepped portion on an inner circumference of the spacer, the effective pressure receiving area of the first diaphragm is made greater than the effective pressure receiving area of the second diaphragm.

4. The fluid control valve according to claim 1, further comprising a pressure regulating diaphragm configured to define a pressure regulating diaphragm chamber communicating with the output port, wherein an inner circumferential portion of the pressure regulating diaphragm is sandwiched between a base holder configured to abut against a stem constituting the valve element and a retaining plate configured to support one end of a pressure regulating spring, and the fluid control valve functions as a pressure regulator.

5. The fluid control valve according to claim 1, further comprising a linear motor configured to control an opening degree of the valve element by controlling a supply of current to an electromagnetic coil, wherein a shaft constituting a movable element of the linear motor abuts against the valve element.

6. The fluid control valve according to claim 5, further comprising a flow rate sensor configured to detect a flow rate of a fluid flowing from the input port toward the output port, wherein a feedback control is performed in a manner that an actual flow rate value detected by the flow rate sensor becomes a target flow rate value.

7. A fluid control valve comprising:

a body including an input port and an output port; and a valve element configured to abut against a valve seat of the body, wherein a first diaphragm and a second diaphragm are disposed between the valve element and the body, a diaphragm chamber is formed between the first diaphragm and the second diaphragm, the first diaphragm separates a valve chamber from the diaphragm chamber, the second diaphragm separates the diaphragm chamber from a back pressure chamber, the diaphragm chamber communicates with the input port, the valve chamber and the back pressure chamber communicate with the output port, and a difference between an effective pressure receiving area of the first diaphragm and an effective pressure receiving area of the second diaphragm is equivalent to a passage area in the valve seat.

8. A fluid control valve comprising:

a body including an input port and an output port; and a valve element configured to abut against a valve seat of the body, wherein a first diaphragm and a second diaphragm are disposed between the valve element and the body, a diaphragm chamber is formed between the first diaphragm and the second diaphragm, the first diaphragm separates a valve chamber from the diaphragm chamber, the second diaphragm separates the diaphragm chamber from a back pressure chamber, the diaphragm chamber communicates with the output port, the valve chamber and the back pressure chamber communicate with the input port, one end part of the valve element extends from the back pressure chamber toward a chamber that is disposed on an outer side of the body and communicates with the output port, and a difference between an effective pressure receiving area of the first diaphragm and an effective pressure receiving area of the second diaphragm is equivalent to a difference between a passage area in the valve seat and a cross-sectional area of the one end part of the valve element.

* * * * *